US012116997B2

(12) United States Patent
Horning et al.

(10) Patent No.: US 12,116,997 B2
(45) Date of Patent: Oct. 15, 2024

(54) PISTON ROD ROTATION FEATURES IN A SPRAY FLUID PUMP

(71) Applicant: Graco Minnesota Inc., Minneapolis, MN (US)

(72) Inventors: Jeromy D. Horning, Albertville, MN (US); August F. Legatt, Maple Lake, MN (US); Justin G. Paulson, Fridley, MN (US); David J. Thompson, Oak Grove, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 697 days.

(21) Appl. No.: 17/297,321

(22) PCT Filed: Nov. 26, 2019

(86) PCT No.: PCT/US2019/063299

§ 371 (c)(1),
(2) Date: May 26, 2021

(87) PCT Pub. No.: WO2020/112809

PCT Pub. Date: Jun. 4, 2020

(65) Prior Publication Data

US 2022/0025882 A1 Jan. 27, 2022

Related U.S. Application Data

(60) Provisional application No. 62/771,698, filed on Nov. 27, 2018.

(51) Int. Cl.

| | |
|---|---|
| ***F04B 53/14*** | (2006.01) |
| ***B05B 9/04*** | (2006.01) |
| *F04B 15/02* | (2006.01) |

(52) U.S. Cl.

CPC .......... *F04B 53/148* (2013.01); *F04B 53/144* (2013.01); *B05B 9/0413* (2013.01); *F04B 15/02* (2013.01)

(58) Field of Classification Search

CPC ...... F04B 15/02; F04B 53/144; F04B 53/148; B05B 9/0413

See application file for complete search history.

(56) References Cited

U.S. PATENT DOCUMENTS

| | | | |
|---|---|---|---|
| 518,490 | A | 4/1894 | Downing |
| 1,026,873 | A | 5/1912 | Locke |

(Continued)

FOREIGN PATENT DOCUMENTS

| | | | |
|---|---|---|---|
| CN | 2206361 | Y | 8/1995 |
| CN | 2687377 | Y | 3/2005 |

(Continued)

OTHER PUBLICATIONS

Communication Pursuant to Article 94(3) EPC for EP Application No. 19827909.3, Dated Nov. 22, 2022, pp. 5.

(Continued)

*Primary Examiner* — Charles G Freay
(74) *Attorney, Agent, or Firm* — Kinney & Lange, P. A.

(57) ABSTRACT

A piston rod (27) for a spray fluid pump includes an interior pumping chamber (40), one or more channels (50) formed on the exterior of the piston rod, and one or more side bores (32) extending through the piston rod and in fluid communication with the interior piston chamber and one or more channels. The one or more channels (50) extend at least partially axially and are open along a length of the channel. The one or more channels are angled offset with respect to the reciprocation axis for imparting a rotational moment on the piston rod to cause rotation of the piston rod during (Continued)

reciprocation of the piston rod. A spray fluid pump comprising such piston rod is also disclosed.

18 Claims, 11 Drawing Sheets

(56) References Cited

U.S. PATENT DOCUMENTS

| | | | | |
|---|---|---|---|---|
| 1,201,543 | A | 10/1916 | Becker | |
| 1,278,769 | A | 9/1918 | Shutt | |
| 1,966,694 | A | 7/1934 | Vaudet et al. | |
| 2,394,371 | A | 2/1946 | Davis | |
| 2,674,506 | A | 4/1954 | Dow | |
| 3,057,300 | A | 10/1962 | Ulbing | |
| 3,106,138 | A | 10/1963 | Thoma | |
| 3,170,298 | A | 2/1965 | Shellhause | |
| 3,172,338 | A | 3/1965 | Ackerman | |
| 3,351,316 | A | 11/1967 | Lewis et al. | |
| 3,489,093 | A | 1/1970 | Thornber | |
| 4,089,229 | A | 5/1978 | Geraci | |
| 4,180,028 | A | 12/1979 | Richter | |
| 4,209,285 | A | 6/1980 | Jasinski et al. | |
| 4,479,759 | A | 10/1984 | Zeitz | |
| 4,785,997 | A | 11/1988 | Liska et al. | |
| 4,804,109 | A | 2/1989 | Vanderjagt | |
| 5,211,611 | A | 5/1993 | Lammers et al. | |
| 5,435,697 | A | 7/1995 | Guebeli et al. | |
| 5,660,534 | A * | 8/1997 | Snow | F04B 53/125 92/173 |
| 5,740,718 | A | 4/1998 | Rathweg | |
| 6,212,999 | B1 | 4/2001 | Thompson | |
| 6,244,226 | B1 | 6/2001 | Berlinger et al. | |
| 6,283,148 | B1 | 9/2001 | Spears et al. | |
| 6,481,987 | B2 | 11/2002 | Ford | |
| 6,599,107 | B2 | 7/2003 | Cooper et al. | |
| 6,702,067 | B2 | 5/2004 | Iversen et al. | |
| 7,162,944 | B2 | 1/2007 | Britz | |
| 7,428,923 | B2 | 9/2008 | Ford | |
| 7,713,035 | B2 | 5/2010 | Ford | |
| 7,878,767 | B2 | 2/2011 | Ford | |
| 8,272,858 | B2 | 9/2012 | Bollwerk et al. | |
| 8,360,756 | B2 * | 1/2013 | Ford | F04B 47/02 417/430 |
| 9,032,862 | B2 | 5/2015 | Yong et al. | |
| 9,188,120 | B2 * | 11/2015 | Ford | E21B 43/35 |
| 9,341,183 | B1 | 5/2016 | Carruth et al. | |
| 2006/0083646 | A1 | 4/2006 | Ford | |
| 2008/0217565 | A1 | 9/2008 | Ford | |
| 2009/0068042 | A1 | 3/2009 | Ford | |
| 2011/0024370 | A1 | 2/2011 | Ford | |
| 2014/0231537 | A1 | 8/2014 | Hukriede et al. | |
| 2016/0186788 | A1 | 6/2016 | Davidson et al. | |
| 2016/0211723 | A1 | 7/2016 | Davidson et al. | |
| 2017/0191563 | A1 | 7/2017 | Horning et al. | |
| 2017/0363208 | A1 | 12/2017 | Ishii et al. | |
| 2018/0238324 | A1 * | 8/2018 | Horning | F16J 7/00 |

FOREIGN PATENT DOCUMENTS

| | | | |
|---|---|---|---|
| CN | 2727450 | Y | 9/2005 |
| CN | 204511866 | U | 7/2015 |
| CN | 106930938 | A | 7/2017 |
| CN | 108457852 | A | 8/2018 |
| DE | 4307327 | A1 | 9/1994 |
| WO | WO0111213 | A1 | 2/2001 |

OTHER PUBLICATIONS

International Preliminary Report for Patentability for PCT Application No. PCT/US2019/063299, Dated Jun. 10, 2021, pp. 7.

Second Chinese Office Action for CN Application No. 201980077912.X, Dated Jan. 20, 2023, pp. 4.

First Chinese Office Action for CN Application No. 201980077912X, Dated Jun. 16, 2022, pp. 17.

International Search Report and Written Opinion for PCT Application No. PCT/US2019/063299, Dated Feb. 17, 2020, pp. 12.

* cited by examiner

PISTON ROD ROTATION FEATURES IN A SPRAY FLUID PUMP

CROSS-REFERENCE TO RELATED APPLICATION(S)

This application is a National Stage entry of PCT Application No. PCT/US2019/063299, filed Nov. 26, 2019, and entitled "PISTON ROD ROTATION FEATURES IN A SPRAY FLUID PUMP," which claims the benefit of U.S. Provisional Application No. 62/771,698, filed Nov. 27, 2018, and entitled "PISTON ROD ROTATION FEATURES IN A SPRAY FLUID PUMP," the disclosure of which is hereby incorporated by reference in its entirety.

BACKGROUND

The present disclosure relates generally to fluid dispensing systems. More specifically, this disclosure relates to displacement pumps for fluid spray systems.

Fluid dispensing systems, such as for spraying paint and other fluids, typically utilize axial displacement pumps to pull a fluid from a source and to drive the fluid downstream. The axial displacement pump includes a piston that is driven in a reciprocating manner along its longitudinal axis to pump the fluid. As the piston reciprocates, fluid is drawn into the pump and flows out of the pump through a second bore. Significant wear of parts may result from a combination of factors, such as the high pressures produced by pumping, the cyclic relative movement of interfacing parts, and the abrasive nature of the fluid being pumped, particularly paint. There is a need to mitigate the effect of part wear.

SUMMARY

According to one aspect of the disclosure, a piston rod elongate along a reciprocation axis includes an interior piston chamber; one or more channels formed on an exterior of the piston rod; and one or more side bores extending through the piston rod and fluidly connecting the interior piston chamber with the one or more channels respectively. Each channel of the one or more channels extends at least partially axially and is open along a length of the channel.

DETAILED DESCRIPTION

Pumps according to the present disclosure reciprocate a piston within a cylinder to pump various fluids, examples of which include paint, water, oil, stains, finishes, aggregate, coatings, putty, sealants, and solvents, amongst other options. One category of fluid is architectural coatings, which includes paint, for roofs, ceilings, walls (interior and exterior), and floors of structures. Paint will be used herein as an example, although any embodiment referenced herein can be used with any type of fluid. A piston pump can generate high fluid pumping pressure, such as between 1,000-5,000 pounds per square inch or even higher, although 2,000-3,500 pounds per square inch is a typical range. High fluid pumping pressure is useful for atomizing the paint into a spray for applying the paint to a surface as a coating. However, the generation of high fluid pumping pressure can cause accelerated wear in the components of the pump, particularly components that move against one another during pumping. The ingredients of paint can be particularly abrasive on moving parts. Aspects of the present disclosure can manage the effects of wear in a piston pump and further facilitate quick and targeted replacement of wear parts, as further discussed herein.

Figure 1:
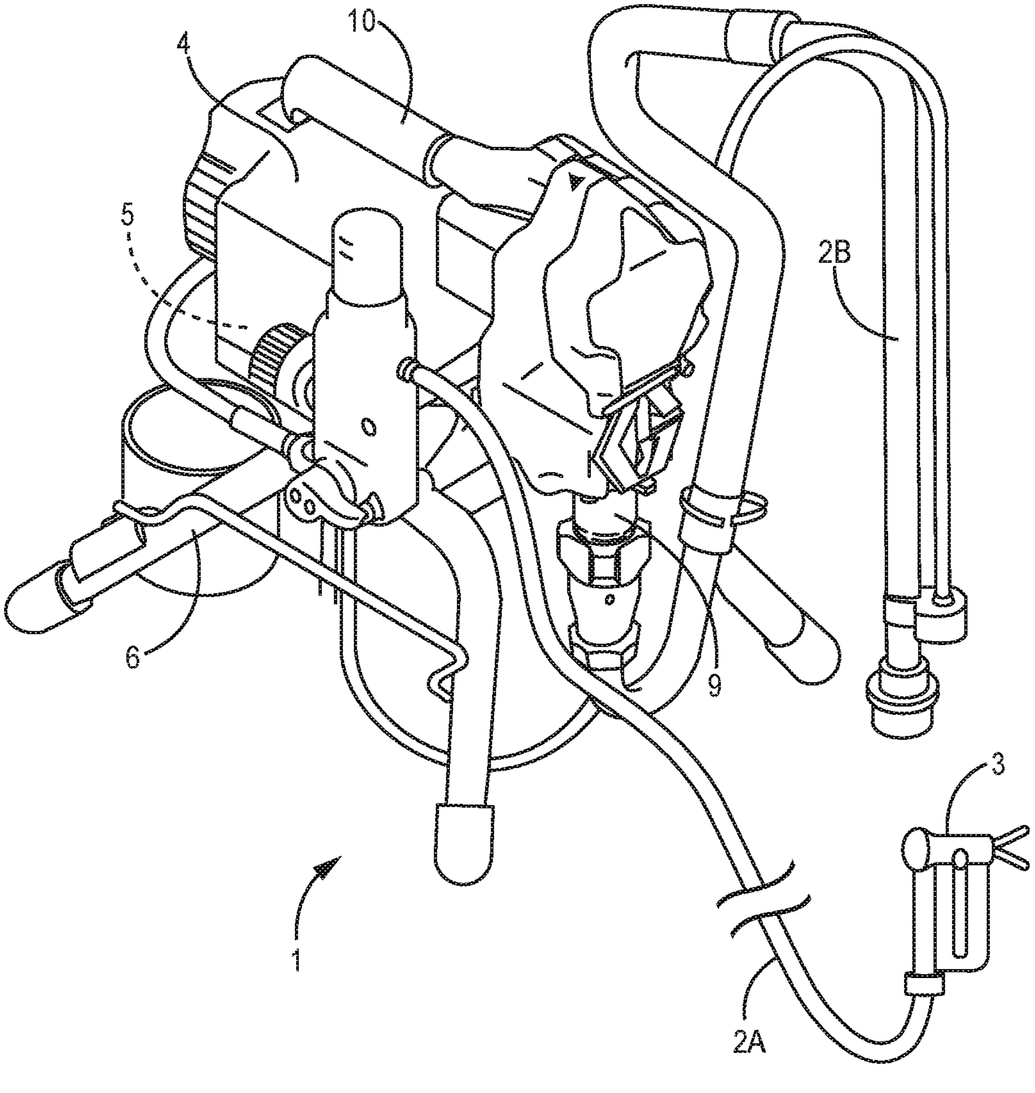
FIG. 1 is an isometric view of a fluid spraying system.
Figure 2:
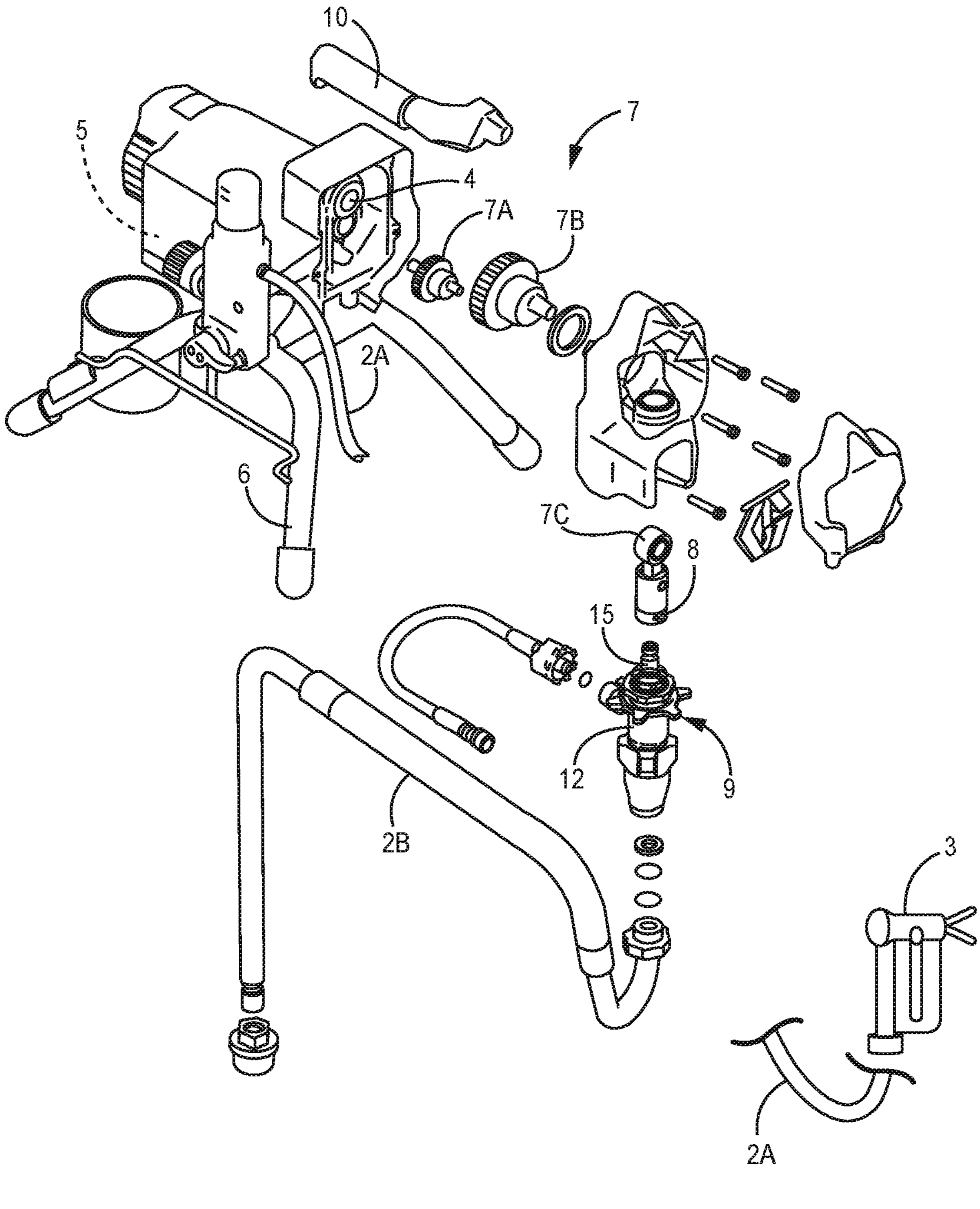
FIG. 2 is a partially exploded view of the fluid spraying system of FIG. 1.

FIG. 1 is an isometric view of fluid spraying system 1. FIG. 2 is a partially exploded view of fluid spraying system 1. FIGS. 1 and 2 will be discussed together. The fluid sprayer system 1 includes a frame 6. The frame 6 includes legs, in the embodiment shown. The frame 6 can additionally or alternatively include wheels or other ground-contacting supports. The frame 6 fully supports a main housing that contains a motor 4 and control 5. The motor 4 is mounted on and supported by the frame 6. The fluid spraying system 1 is man-portable and includes a handle 10 fixed to the frame 6 for picking up and carrying the fluid spray system 1 by hand. Some larger embodiments the fluid spraying system 1 may be wheeled by a person tilting and pushing the fluid spraying system 1.

The control 5 delivers power to the motor 4. The motor 4 can be an electric brushless rotor stator motor, amongst other options. In other versions, the motor 4 could be a gas powered motor or a pneumatic or hydraulic powered motor, amongst other options. Generally, the motor 4 outputs rotational mechanical motion. The motor 4 turns drive 7, which in the illustrated embodiment includes drive parts 7A-7C. In the example shown, drive parts 7A-7C include various components such as gearing (7A), eccentric (7B), and a crank (7C) for turning rotational motion output by the motor 4 into linear reciprocating motion. The drive parts 7A-7C can include different components, such as a scotch yoke or other mechanism for converting rotation motion into linear reciprocating motion. The drive 7 reciprocates drive coupling 8.

The drive coupling 8 connects with a top of a piston 15 of the pump 9 to reciprocate the piston 15 relative to a cylinder 12 of the pump 9. Independent of the drive coupling 8, the pump 9 can be mounted on the frame 6 to brace or otherwise hold the cylinder 12 in place during piston 15 reciprocation. A rigid connection of the pump 9 to the frame 6 can be established by a ring clamping on a flange or the exterior of the cylinder of the pump 9, pinching the flange against a base of the fluid spraying system 1. The drive coupling 8 includes an attachment mechanism for connecting to an end (e.g., top) of the piston 15. One design of the attachment mechanism includes a slot formed in the drive coupling 8 for receiving and cradling a knob end of the piston 15. Other connection means are possible for similarly connecting the drive coupling 8 to the piston of the pump 9.

The pump 9 takes paint in through the intake hose 2B. The end of the intake hose 2B can be submerged in a bucket filled with paint or other fluid to be sprayed. The pump 9 places the paint under pressure and outputs the paint through hose 2A to a spray gun 3. The spray gun 3 includes a trigger which can be actuated by hand to open an internal valve (not illustrated) and release the paint as an atomized spray. Once the control 5 is turned on to power the motor 4 and the pump 9 is primed, the fluid spraying system 1 can be operated to spray by pulling the trigger of the spray gun 3.

Figure 3:
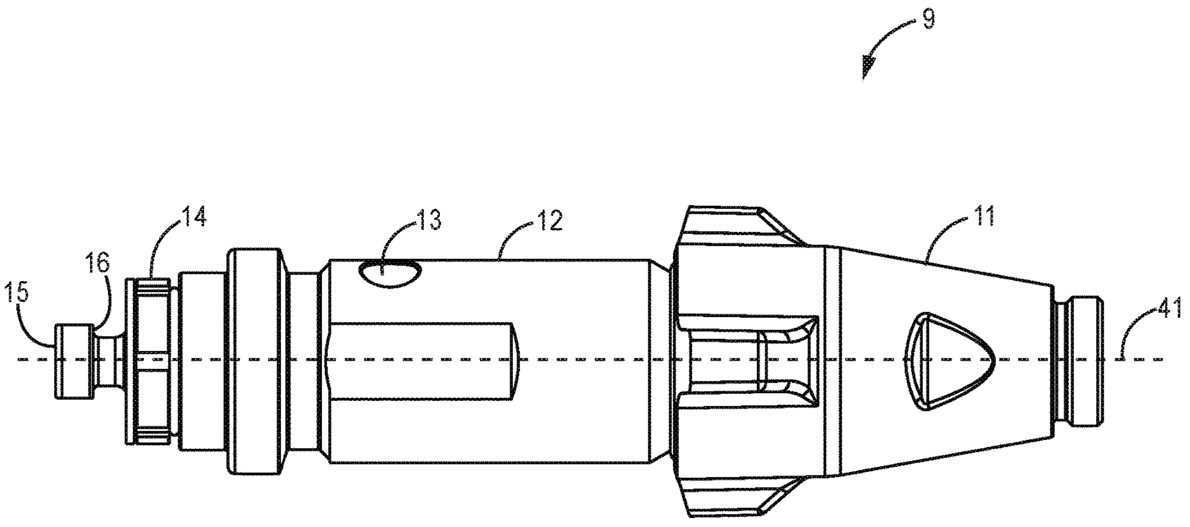
FIG. 3 is an elevation view of a displacement pump.

FIG. 3 is an elevation view of pump 9. The pump 9 includes a lower housing 11, cylinder 12, retaining nut 14, and piston 15. The lower housing 11 can fit over, and/or be threaded onto, a lower end of the cylinder 12. Paint is drawn into the pump 9 through a bottom opening of the lower housing 11. The cylinder 12 includes a pump outlet port 13. The paint is output under pressure from the pump 9 though the pump outlet port 13. The pump outlet port 13 can be threaded. A threaded hose fitting can thread into the pump outlet port 13 to maintain fluid pressure within the pump outlet fluid line. The pump outlet port 13 can be in fluid communication with the hose 2A (FIGS. 1-2) (possibly with an intermediary filter) and the spray gun 3 (FIGS. 1-2). The pump 9 further includes a retaining nut 14 which can be threaded into a top end opening of the cylinder 12.

The piston 15 reciprocates within the cylinder 12. As shown, the piston 15 protrudes from a top of the pump 9, out from the cylinder 12 and the retaining nut 14. The portion of the piston 15 that is exposed includes a piston coupling 16. The piston coupling 16 in this embodiment is a head on the end of a neck. The piston coupling 16 can couple the piston 15 to the drive coupling 8 (FIG. 2). For example, the drive coupling 8 can include a socket that receives the head of the piston coupling 16 and cradles around the head about the neck of the piston coupling 16. The socket and cradle of the drive coupling 8 can be "U" shaped to allow the knob end of the piston coupling 16 to be slid in and out from only one side of the socket and cradle. The coupling thereby is engaged and disengaged only by lateral sliding (i.e. orthogonal to the reciprocation axis) for coupling and decoupling, without any other motion or actuation, but does not allow relative axial movement between the piston 15 and the drive coupling 8. The socket and cradle surround three of four lateral sides of the knob end of the piston coupling 16 and has a lateral opening on the fourth of the four lateral sides. The space within the cradle is narrower than the space within the socket but the cradle still allows the neck of the piston coupling 16, but not the wider knob portion of the piston coupling 16, to extend through and past the cradle. The interface can fix the piston 15 to the drive coupling 8 axially, such that up and down reciprocating motion of the drive coupling 8 correspondingly reciprocates the piston 15 along axis 41. The interface allows the piston 15 to rotate about the axis 41. The piston coupling 16 can rotate within the socket of the drive coupling 8. The head of the piston coupling 16 can slide laterally into and out of the socket of the drive coupling 8 to connect and disconnect the piston coupling 16 from the drive coupling 8.

During reciprocation of the piston 15, the cylinder 12 is braced with respect to the main body of the paint spraying system 1, such as the frame 6 and the motor 4, so that the piston 15 reciprocates with respect to the cylinder 12. Due to the mounting of the pump 9 to the frame 6, the cylinder 12 does not rotate, reciprocate, or otherwise move unless when being dismounted for servicing (when spraying is not possible).

Figure 4:
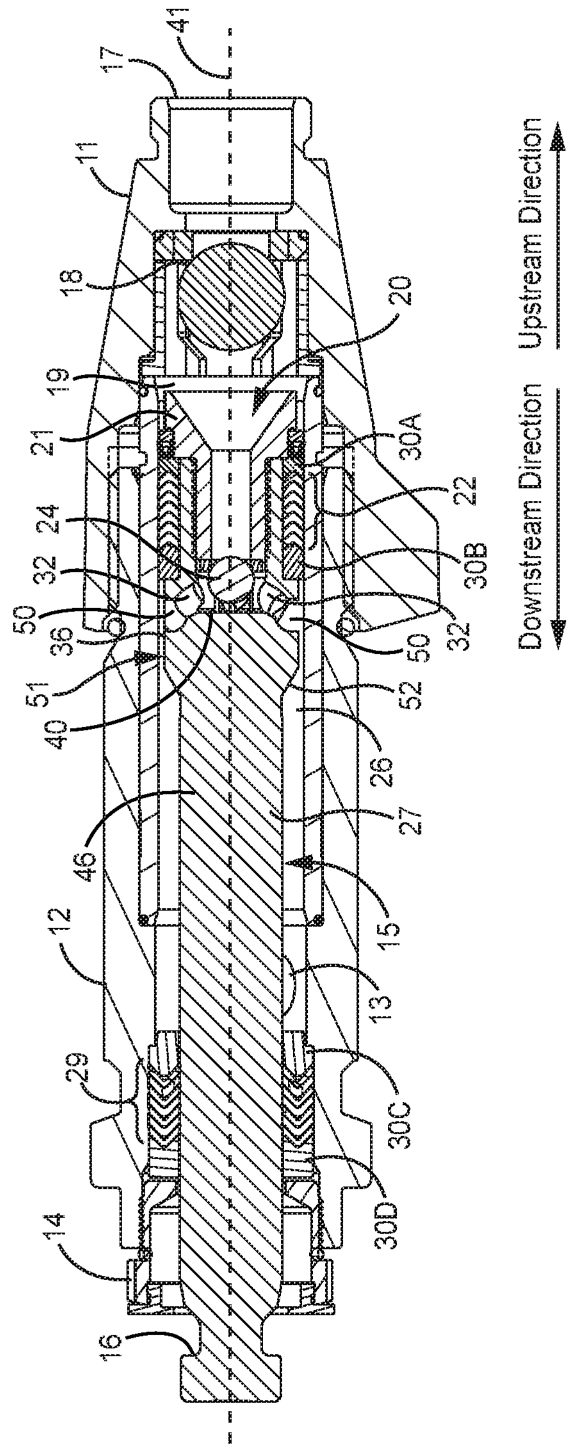
FIG. 4 is a cross-sectional view taken along line 4-4 in FIG. 3.
Figure 5:
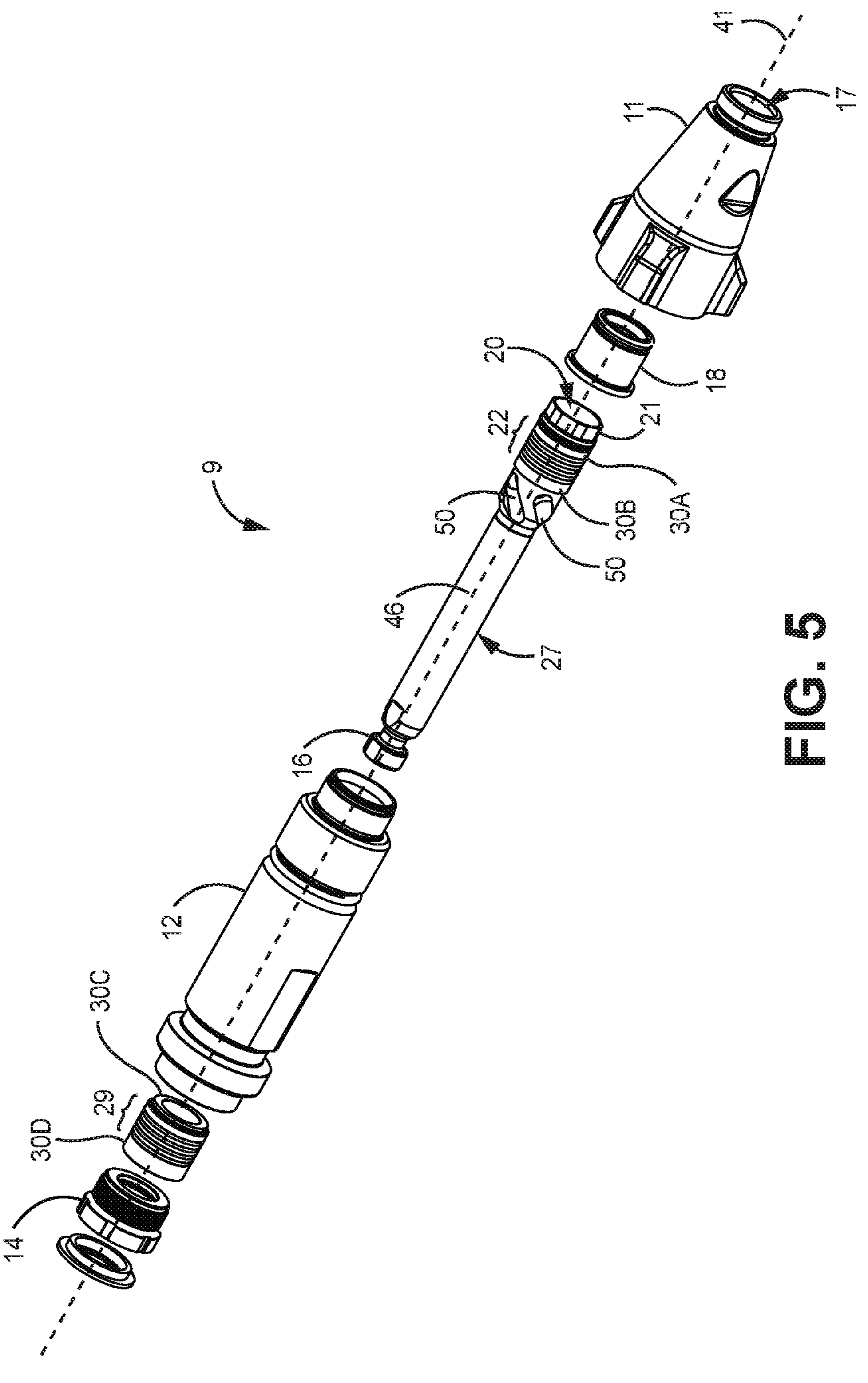
FIG. 5 is an exploded isometric view of the displacement pump shown in FIG. 3.

FIG. 4 is a cross-sectional view of pump 9. FIG. 5 is a view of the pump 9 exploded along the piston axis 41. FIGS. 4 and 5 will be discussed together. Relative upstream and downstream directions are indicated by arrows in FIG. 4, and such directions represent the general flow of paint through the pump 9 from the upstream direction to the downstream direction (the paint exiting the pump 9 through the pump outlet port 13). The piston 15 and cylinder 12 are each coaxial with piston axis 41. The piston 15 reciprocates along the piston axis 41 relative to the cylinder 12. The piston axis 41 is coaxial with the axis of the upstream and downstream directions. The piston axis 41 can be the axis along which the piston 15 reciprocates. The term radial refers to a direction orthogonal to the piston axis 41, such as any of the directions 360 degrees orthogonally about the piston axis 41. An example of a radial direction is shown by arrow R in FIG. 8.

In the illustrated embodiment, the piston 15 includes a first seal 22. A first chamber 19, defined at least in part by the inner surface of the cylinder 12, is separated from a second chamber 26 by the first seal 22. The second chamber 26 is defined at least in part by the inner surface of the cylinder 12. The first seal 22 can be a piston seal in that it moves with the piston 15. In various alternative embodiments, the first seal 22 is fixed to the cylinder 12 and the piston 15 moves relative to the first seal 22.

The first seal 22 dynamically seals between the exterior surface of the piston 15 and the opposing interior surface of the cylinder 12. The first seal 22 forces paint in the first chamber 19 to flow through the piston inlet 20 and ultimately out the channels 50 instead of the paint flowing around the piston 15 as the piston 15 reciprocates. The first seal 22 in this embodiment comprises stacked packing rings, which can be alternating polymer and leather rings (or all polymer rings), though it is understood that other configurations are possible. In other embodiments, the first seal 22 can be a polymer sleeve, which may include one or more sealing flanges. Glands 30A, 30B bracket and capture the first seal 22. In this embodiment, the first seal 22 is captured on the piston 15 and moves with the piston 15 relative to the circumferential inner surface of the cylinder 12, but in various other embodiments the first seal 22 is fixed to the inner surface of the cylinder 12 and the exterior circumferential surface of the piston 15 moves relative to the stationary first seal 22. In various embodiments, the piston 15 has only one seal (whether a stack of rings or one element) that seals between the exterior annular surface of the manifold portion 51 of the piston 15 and the interior annular surface of the cylinder 12, which can be the first seal 22.

A second seal 29 prevents paint in the second chamber 26 from leaking along the piston 15 or the inner surface of the cylinder 12 out of the top of the pump 9. The second seal 29 can be a throat seal. The second seal 29 also helps maintain output pressure in the second chamber 26. The second seal 29 is a dynamic seal and seals between the interior of the cylinder 12 and the exterior of the piston 15 even when these components reciprocate relative to each other. The second seal 29 can, in some examples, be identical to the first seal 22. For example, the second seal 29 can comprise a stack of polymer and/or leather sealing rings captured between glands 30C, 30D. The glands 30C, 30D capture the second seal 29 and hold the second seal 29 to the cylinder 12. In this way, the piston 15 moves relative to the element(s) of the second seal 29.

The second chamber 26 is generally tubular in shape and changes in volume as the piston 15 reciprocates. The lateral (or circumferential) walls of the second chamber 26 are defined by the outer surface of the piston rod 27 and the inner surface of the cylinder 12. The downstream end of the second chamber 26 is defined by the second seal 29, which remains static in position in this embodiment. The upstream end of the second chamber 26 is defined by the first seal 22, which axially moves during the piston 15 reciprocation cycle to alternately increase and decrease the volumes of the first and second chambers 19, 26 to move paint through the pump 9.

In operation, the paint enters the pump 9 though the pump inlet port 17. The pump inlet port 17 is formed in the lower housing 11 in this embodiment. The lower housing 11 houses an inlet check valve 18. The inlet check valve 18 is a one-way valve which allows paint to flow in the downstream direction but blocks paint from flowing in the upstream direction. The inlet check valve 18 is shown as a ball and seat valve. As best seen in FIG. 5, the inlet check valve 18 can be inside of a housing that fits within the lower housing 11. Generally, gravity pulls the ball onto the seat to close the inlet check valve 18. The flow of paint from the pump inlet port 17 in the downstream direction can overcome the weight of the ball to lift the ball off of the seat to open the valve. A spring may be used to maintain the ball on the seat until the spring force is overcome. Different valve designs or features are possible, such as a poppet, spring, or other type of inlet valve are possible for inlet check valve 18. The upstream movement of the piston 15 decreases the volume of the first chamber 19, increasing pressure in the first chamber 19 and also pushing the inlet check valve 18 closed.

After passing the inlet check valve 18, paint enters a first chamber 19. The first chamber 19 is defined by and within the cylinder 12. The first chamber 19 is in fluid communication with the piston 15. The piston 15 reciprocates to increase and decrease the volume of the first chamber 19. Specifically, on an upstroke, when the piston 15 moves in the downstream direction and which can be referred to as an intake stroke, the first chamber 19 expands, pulling paint from the inlet port 17 past the check valve 18 into the first chamber 19. On the downstroke, when the piston 15 is moving in the upstream direction and which can be referred to as a pumping stroke, the volume in the first chamber 19 is decreased, thereby increasing the pressure within the first chamber 19. This action forces the paint, momentarily, in the upstream direction which closes inlet check valve 18. Further on the downstroke, the paint in the first chamber 19 is forced through a piston inlet 20 formed in the piston 15. The paint flows into the interior of the piston 15. In the embodiment shown, the piston 15 includes a piston face 21. The piston face 21 includes a conical inlet 20 to channel paint into the interior of the piston 15, although other piston face designs are possible.

A piston check valve 24 is located within the piston 15. The piston check valve 24 moves with the piston 15 as the piston 15 reciprocates. The first chamber 19 is between the inlet check valve 18 and the piston check valve 24. The piston check valve 24 allows paint to flow in the downstream direction, evacuating from the first chamber 19, but prevents paint from flowing back in the upstream direction into the first chamber 19. Check valve 24 is shown as a ball and seat valve similar to the inlet check valve 18, but as earlier described, other valve designs and features are possible.

When the piston 15 is on the upstroke, the piston check valve 24 closes (e.g., ball engages seat) to prevent paint from flowing from an interior piston chamber 40 within the piston 15 back through the piston inlet 20. However, when the piston 15 is on the downstroke, the flow of paint opens the piston check valve 24 (e.g., unseats the ball) and the piston check valve 24 opens to allow paint from the piston inlet 20 to flow into the interior piston chamber 40 within the piston 15. From the interior piston chamber 40, paint flows through side bores 32. The side bores 32 are cylindrical passages that connect the interior piston chamber 40 to channels 50. The channels 50, as further described herein, are open and extend along the exterior of the piston 15.

Due to the piston check valve 24 regulating flow of paint through the interior of the piston 15, paint is pumped on both the upstroke and the downstroke of the piston 15. In various embodiments, the piston 15 has only one fluid inlet (in this case piston inlet 20). In the shown embodiment, the only fluid outlets of the piston 15 are the channels 50, each channel 50 being fed by a single respective side bore 32. Fluid being pumped can only enter the piston 15 through the piston inlet 20 and exit the piston 15 through the side bores 32 and channels 50.

On the downstroke, paint in the first chamber 19 is forced into the piston inlet 20 by the advancing piston face 21, past the piston check valve 24 into the interior piston chamber 40, through the side bores 32, leaves the piston 15 from the channels 50 into the second chamber 26, and through the pump outlet port 13. In operation, paint in the second chamber 26 is forced through the pump outlet port 13 on both the upstroke (due the piston check valve 24 being closed and the first seal 22 sealing with the inner surface of the cylinder 12 and pushing the paint in the second chamber 26 downstream) and the downstroke (due to the inlet check valve 18 being closed and the first seal 22 sealing with the inner surface of the cylinder 12 and reducing the volume of the first chamber 19 forcing the paint into the second chamber 26) due to the action of the piston check valve 24. In this way, the pump 9 is a double acting pump which promotes consistent cyclic output while minimizing output flow or pressure spikes. The pump outlet port 13 can, in some examples, be the only outlet for paint being expelled under pressure from the pump 9, absent failure of a seal.

The piston 15 incudes piston rod 27. The piston rod 27 is cylindrical, and includes a cylindrical main body 46. The piston coupling 16 protrudes in the downstream direction relative to the main body 46. The main body 46 can have a constant outer diameter along its length. The main body 46 can extend from the downstream edge of a taper 52 to the upstream edge of the piston coupling 16. The second seal 29 contacts and seals with a circumferential exterior surface of the main body 46. The length of the piston rod 27, measured along the piston axis 41, ranges from 5.0 inches to 15.0 inches, although larger and smaller sizes may be possible.

Figure 6:
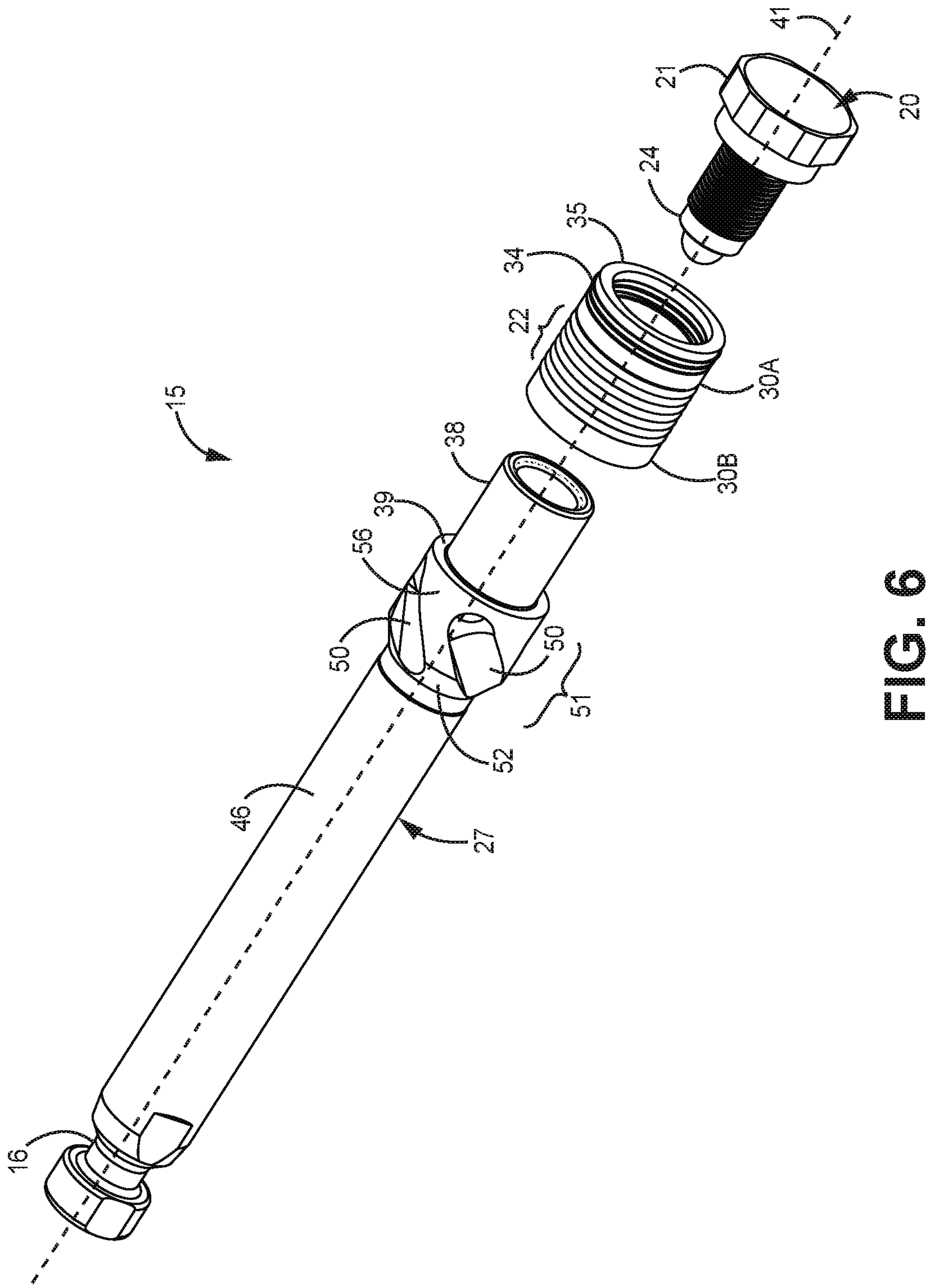
FIG. 6 is an exploded isometric view of a piston.

FIG. 6 shows a detailed view of the piston 15 with sealing components exploded with respect to the piston rod 27. The sealing components can further include, adjacent the gland 30A, a wiper ring 34 and a washer 35. The wiper ring 34 sweeps paint from the inner wall of the cylinder 12 along the first chamber 19 (FIG. 4) as the piston 15 advances on the downstroke, but is separate from, and does not perform the same sealing function, as the first seal 22. The wiper ring 34 can be formed from polymer. The washer 35 can be formed from metal. The washer 35, wiper seal 60, gland 30A, first seal 22, and gland 30B fit on cylindrical recessed portion 38 of piston rod 27. The cylindrical recessed portion 38 has a smaller diameter than a manifold portion 51, with a shoulder 39 defining a wider annular portion of the piston rod 27 than the cylindrical recessed portion 38. The sealing components, including the glands 30A and 30B, the first seal 22, the wiper ring 34, and/or the washer 35, can fit on and around the cylindrical recessed portion 38. These sealing components can be pinched between the shoulder 39 and the piston face 21 to retain these components on the cylindrical recessed portion 38.

The piston face 21 screws into a threaded aperture on the upstream side of the piston rod 27 to form a second shoulder that captures the washer 35, wiper seal 60, gland 30 A, first seal 22, and/or gland 30B on the cylindrical recessed portion 38 of the manifold portion 51, and further captures the ball and the seat of the piston check valve 24 within the piston rod 27.

In this embodiment, the piston rod 27 includes a main body 48 and a piston manifold 51. The main body 48 can be solid metal. The main body 48 can be cylindrical, such that the exterior surface of the main body 48 can be cylindrical. The main body 48 can be cylindrical with uniform diameter from the downstream edge of the piston manifold 51 to the upstream edge of the piston coupling 16. The main body 48 can form the longest axial part of the piston 15. The majority of the length of the piston 15 along the piston axis 41 can be formed by only the main body 48, whereas the individual and/or combined lengths of the piston coupling 16, the piston manifold 51, and the piston face 21 is shorter than the main body 48. The main body 48 may be at least twice the length of the piston manifold 51. The exterior surface of the main body 48 is a sealing surface that dynamically seals with the second seal 29 (best seen in FIG. 4).

The piston rod 27, as shown, is a unitary part. The piston rod 27 can be a single piece formed from metal, such as steel (e.g., stainless steel), with all features machined out from the single piece. In an alternative embodiment, the piston rod 27 could be formed by two separate pieces of metal joined together. For example, the main body 48 and the manifold portion 51 may be formed separately and then threaded, welded, and/or press fit together.

At its most upstream end, the piston rod 27 includes the recessed portion 38. The recessed portion 38 has a reduced diameter to accommodate the sealing components as previously described. The recessed portion 38 portion ends in the downstream direction at the shoulder 39. The shoulder 39 can be an expansion in the diameter of the piston rod 27 relative the recessed portion 38. The shoulder 39 serves as a stop to prevent the sealing components, such as the gland 30B, from moving past the shoulder 39 in the downstream direction along the piston rod 27.

The piston rod 27 includes a manifold portion 51. In this embodiment, the upstream end of the manifold portion 51 is defined by the shoulder 39. Within the manifold portion 51, paint is routed from a single channel inside the piston rod 27 (e.g., through the piston chamber 40) and out of the piston rod 27 via multiple channels 50. The channels 50 are limited to the manifold portion 51. The channels 50 do not extend along the recessed portion 38 or the main body 48. The channels 50 are disposed radially outward relative to the main body 48. In some embodiments, the entirety of each of the channels 50 is radially outward from the main body 48. In some embodiments, the deepest part of the channel 50 (e.g., the lateral center of the channel 50) is at the same radial position (e.g., radial distance from piston axis 41) as the exterior surface of the main body 48. The manifold portion 51 has a greater diameter than the rest of the piston rod 27 with respect to the axis 41. For example, the manifold portion 51 has a greater diameter than the main body 48 and the recessed portion 38. The shoulder 39 forms the upstream edge of the manifold portion 51 while the downstream edge of the transition 52 forms the downstream edge of the manifold portion 51.

While four side bores 32 and four channels 50 are shown herein along the piston rod 27, there could instead be a single piston bore 32 respectively connecting with a single channel 50, or a pair of side bores 32 connecting with a pair of channels 50, or three side bores 32 respectively connecting with three channels 50, or greater than four side bores 32 respectively fluidly connecting with greater than four channels 50. The side bores 32 can be evenly arrayed about the piston axis 41 of the piston 15. The channels 50 can be evenly arrayed about the piston axis 41 of the piston 15. The channels 50 can be evenly arrayed about the circumference of the piston 15.

The downstream end of the manifold portion 51 is defined by the end of the transition 52. The transition 52 includes an annular (i.e. entirely about the piston rod 27) tapering of the diameter of the piston rod 27, and particularly the diameter of the manifold portion 51. The transition 52 can have a consistent slope (in the upstream-to-downstream direction) transitioning diameters of annular portions of the piston rod 27. The slope can be linear or curved upstream-to-downstream. The transition 52 reduces the diameter of the piston rod 27 from the wider exterior surface 56 of the manifold portion 51 to the narrower exterior surface of the main body 46. As shown, the transition 52 decreases in diameter in the downstream direction. While the transition 52 is shown as a taper, the decrease in diameter could instead be more abrupt, such as by having the same flat annular profile of the shoulder 39 forming transition 52. The channels 50 do not extend downstream of the transition 52. In particular, the transition 52 terminates the channels 50 in the downstream direction being that the channels 50 are depressions formed into the larger-diameter manifold portion 51 and the transition 52 reduces the diameter of the piston rod 27 to a greater depth than the depth of the channels 50. As further explained herein, the channels 50 direct the flow of paint exiting the piston rod 27, and the manifold portion 51 in particular, in orientations that generate a rotational moment about the piston 15 to rotate the piston during reciprocation.

The manifold portion 51 includes an exterior surface 56. The exterior surface 56 is cylindrical except for the interruptions of the channels 50. The upstream edge of the exterior surface 56 is the shoulder 39. The downstream edge of the exterior surface 56 is the upstream edge of the transition 52.

As best seen in FIG. 4, the exterior surface 56 of the manifold portion 51 is separated from the cylindrical interior surface of the cylinder 12 by piston-cylinder space 36. The radial distance between the exterior surface 56 of the manifold portion 51 and the cylindrical interior surface of the cylinder 12 may range from 0.03-0.07 inches (about 0.76-1.78 millimeters) depending on the embodiment, although larger and smaller radial separation distances are possible. The radial separation difference between the walls defining the channels 50 (particularly the bottom of the channels 50) and the interior surface of the cylinder 12 are greater than along the exterior surface 56, thus providing more radial space for the flow of paint within the channels 50 along the piston rod 27 as compared to the radial space between the exterior surface 56 of the manifold portion 51 and the cylindrical interior surface of cylinder 12.

Figure 7:
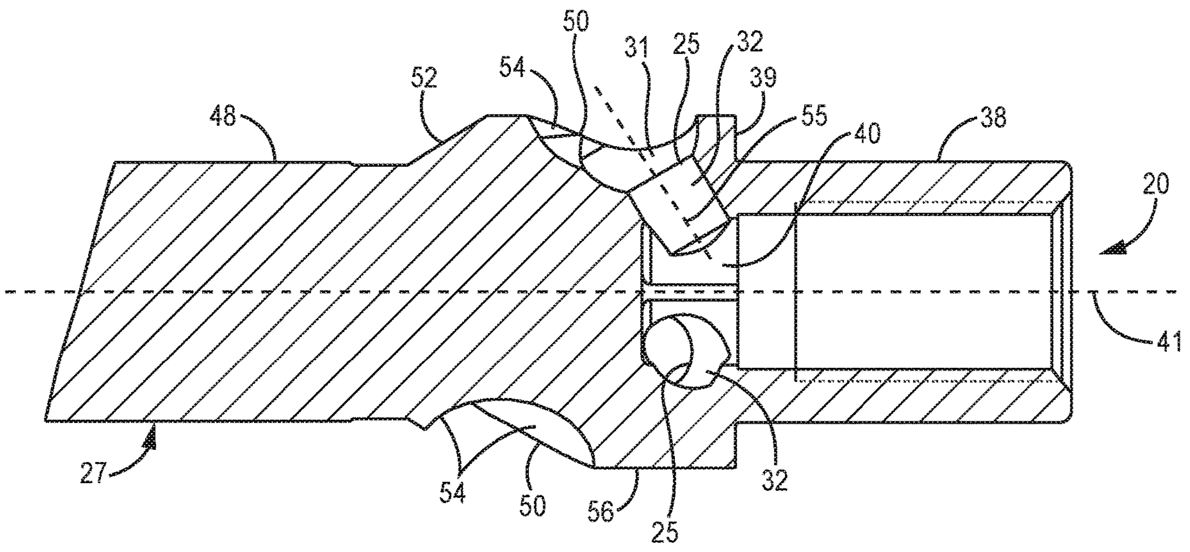
FIG. 7 is a cross-sectional view of a manifold portion of a piston.

FIG. 7 shows a cross-sectional view of the manifold portion 51 along the piston axis 41. The piston chamber 40 is coaxial with the piston axis 41. As shown, the manifold portion 51 includes a plurality of side bores 32 that branch from a piston chamber 40 formed through the axial core of the manifold portion 51. The side bores 32 fluidly connect the piston chamber 40 with the channels 50, respectively. The side bores 32 are formed (e.g., machined) through the metal that forms the manifold portion 51. Paint flowing through the manifold portion 51 enters through the piston inlet 20 and travels past the piston check valve 24 (FIG. 4)

then flows through the piston chamber 40 and then through the side bores 32, ultimately exiting the piston 15 from the channels 50.

Each side bore 32 extends coaxially along a respective side port axis 55. In being coaxial with the side bore axis 55, each side bore 32 is angled relative to the piston axis 41. Such angling of the side bores 32 direct the paint in the downstream direction as the paint exits the side bores 32. As such, the paint is not ejected from the side bore axis 55 in a purely radial direction relative to the piston axis 41, or in a purely parallel direction relative to the piston axis 41. Instead, the side bores 32 direct each jet of exiting paint in a downstream direction along the side port axis 55. The angling of the side bores 32 in the downstream direction directs the exiting paint jets toward the pump outlet port 13 in the cylinder 12 to facilitate efficient flow of paint out of the pump 9.

Figure 8:
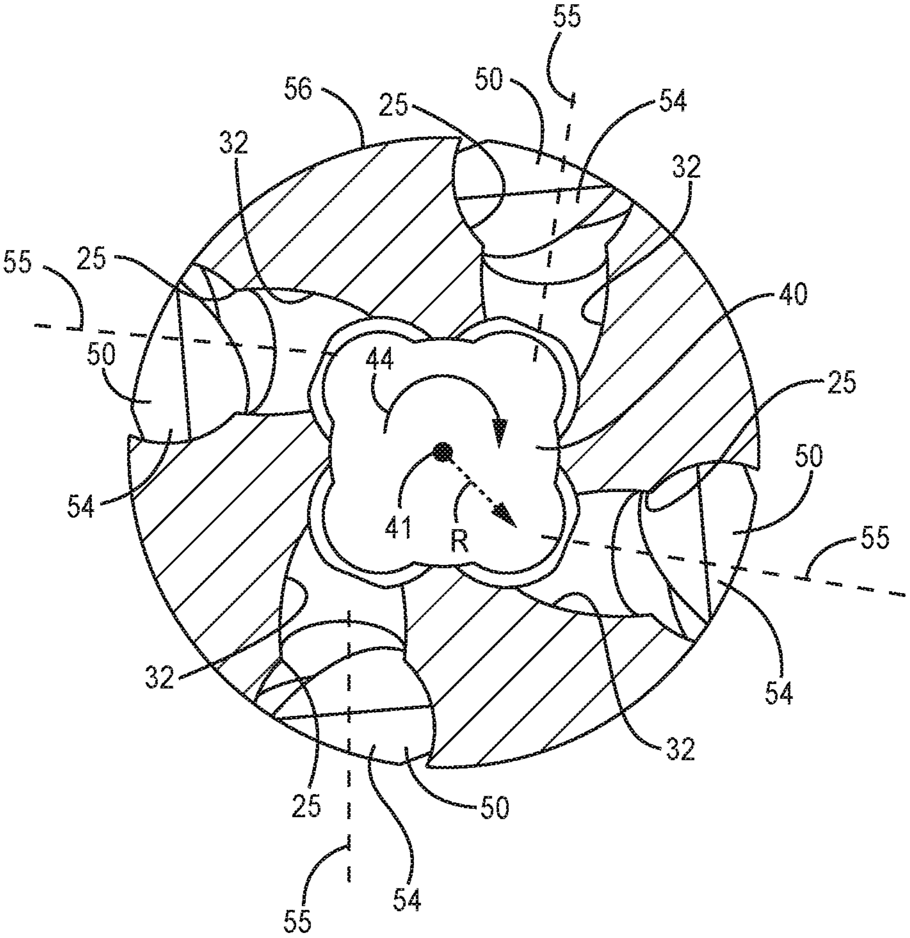
FIG. 8 is a cross-sectional view of a manifold portion of a piston.

FIG. 8 shows a cross-sectional view aligned with the piston axis 41. As shown, the side bores 32 and the channels 50 are evenly arrayed about the circumference of the piston 15. As shown in FIG. 8, the piston chamber 40 has a greater cross sectional area than any one of the side bores 32. The side bores 32 are the only downstream outlets of the piston chamber 40. As such, the piston chamber 40 is not circular along its entire length along the piston axis 41.

As shown, the side bore axes 55 are offset with respect to the piston axis 41. As such, the side bore axes 55 do not intersect the piston axis 41. The side bores 32 direct jets of paint along the side bore axis 55. Being coaxial with the side bore axes 55, each jet of paint has a tangential component with respect to the circumference of the piston 15. The center of mass of the piston 15 is along the piston axis 41. The side angling of the side bores 32 ejects the paint along vectors (aligned with the reciprocation axes 41) so as to impart a moment on piston 15, torqueing the piston 15. The side bores 32 are orientated to expel paint in generally the same circumferential direction about the piston 15. Any moments imparted on piston 15 by the jets are cumulative. The cumulative moment can cause piston 15 to rotate circumferentially about the piston axis 41 in a rotation direction 44 during reciprocation of the piston 15 when fluid is pumped. However, the limited separation distance of the piston-cylinder space 36 (FIG. 4) can result in the fluid being eject building pressure along the manifold portion 51, generating hydraulic resistance to further fluid ejection and downstream movement of the paint, potentially blunting the effect of the paint jets along the piston axis 41 from the side bores 32. Therefore, channels 50 are provided to route the flow of paint within the piston 15 to exits for which the ejection jets have greater clearance for developing, as further discussed herein.

Figure 9:
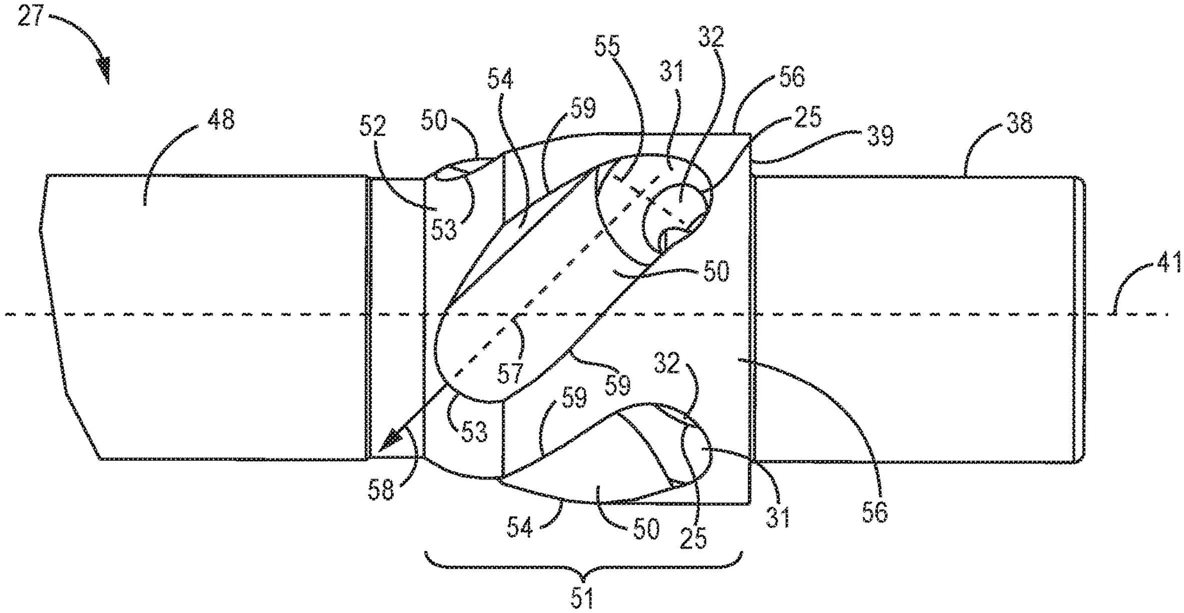
FIG. 9 is a detail side elevation view of an upstream end of a piston.
Figure 10:
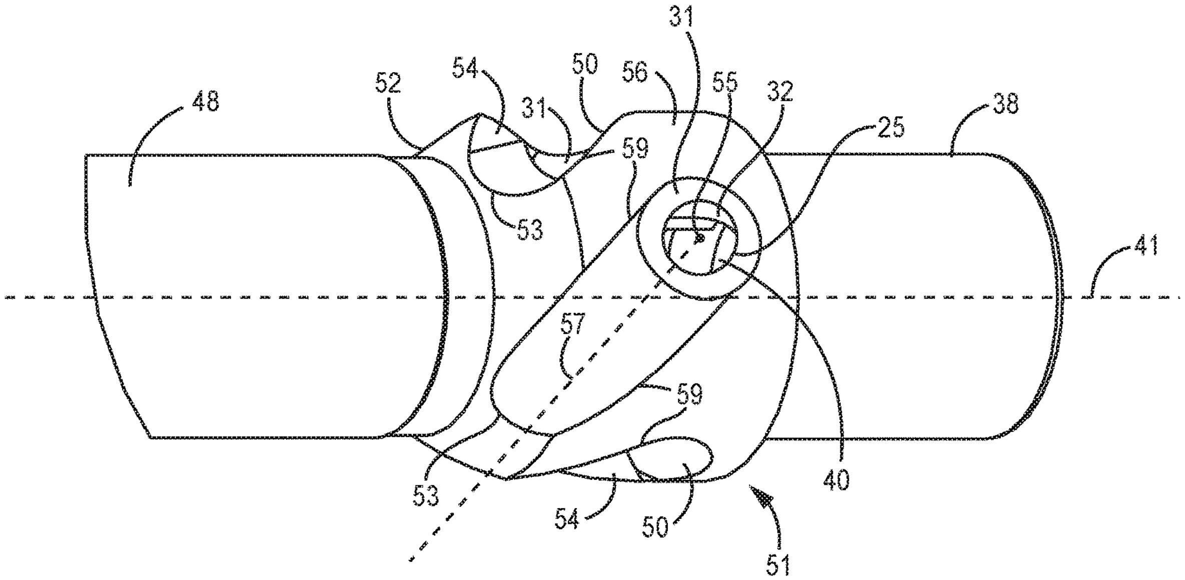
FIG. 10 is detail side view of the upstream end of the upstream end of the piston shown in FIG. 9.
Figure 11:
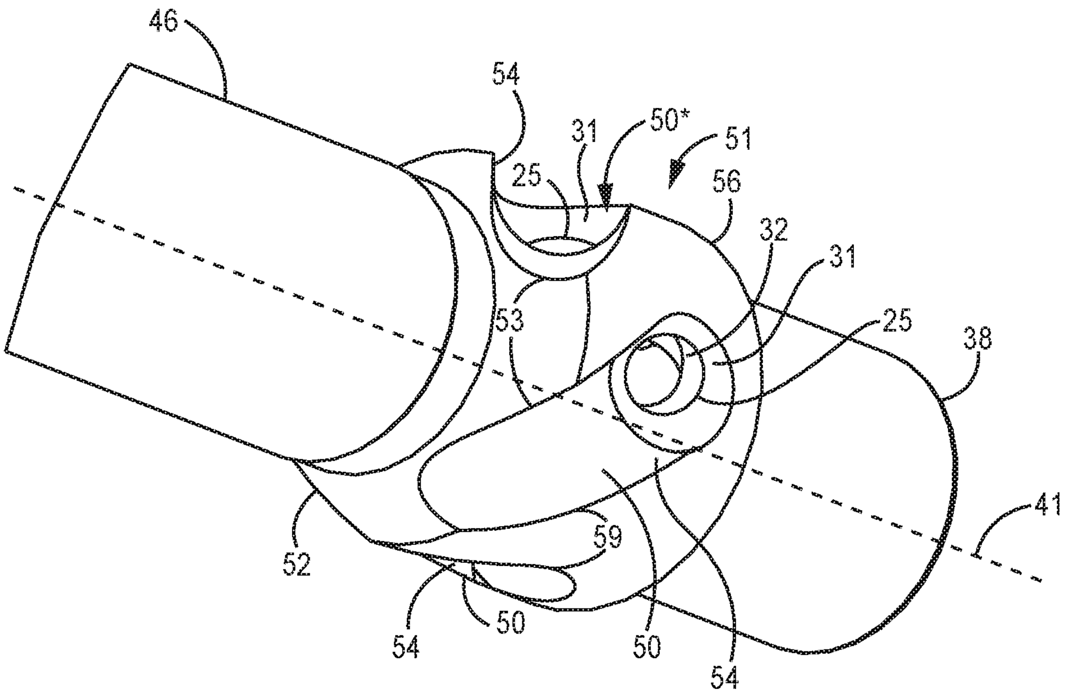
FIG. 11 is a detail side view of the upstream end of the upstream end of the piston shown in FIG. 9.

FIG. 9 is a detailed side view of the upstream end of the piston rod 27. FIG. 10 is a detailed side view of the upstream end of the piston rod 27, the view coaxial with the side bore axis 55 of one of the side bores 32. FIG. 11 is a detailed side view of the upstream end of the piston rod 27, the view aligned with one of the channels 50 (the aligned channel identified as 50* in FIG. 11). FIGS. 9-11 will be discussed together.

The views shown in FIGS. 9-11 show the manifold portion 51 and the channels 50 formed in the manifold portion 51. Each channel 50 is defined by a channel wall 54. The channel wall 54 is formed from the metal that forms the manifold portion 51, and can be the metal that forms the rest of the piston rod 27. Each channel 50 can begin at the termination of the side bore 32 at the outer cylindrical end 25 of the side bore 32. Each channel 50 can end at downstream lip 53. The downstream lip 53 of the channel 50 can be the downstream-most ridge defining an edge of the channel 50. In that way, the downstream lip 53 can represent the downstream termination of a channel 50. The downstream lip 53 can be the part of the piston rod 27 where the transition 52 reduces the diameter of the piston rod 27 to be below the depth of the channel 50, terminating the channel 50.

The sides of each channel 50 are defined by lateral channel edges 59. The lateral channel edges 59 are adjacent the cylindrical exterior surface 56, and represent the point at which the depression of the channel 50 interrupts the cylindrical exterior surface 56 of the manifold portion 51.

In some embodiments, the channel 50 has the same radial depth along its entire length. In some embodiments, as shown herein, the radial depth of the channel 50 can vary along the length of the channel 50. In the illustrated embodiment, the channel 50 includes a bowl 31. The bowl 31 is a partial hemispherical depression (with respect to the exterior surface 56) in the piston manifold 51. The bowl 31 can be aligned with the side bore 32 with respect to the piston axis 41. The bowl 31 can be coaxially aligned with the side bore axis 55 (FIG. 7) (e.g., the side bore axis 55 can be aligned with the apex of the hemispherical shape of the bowl 31). In this embodiment, the bowl 31 is the upstream-most portion of each channel 50.

In this embodiment, the only portion of the channel 50 having a consistent depth along the length of the channel 50 is located on the downstream side of the bowl 31. The walls of the channel 50, including the bowl 31, on the upstream side of the channel 50 with respect to the outer cylindrical end 25 of the side bore 32 are sloped between the outer cylindrical end 25 and the exterior surface 56, such that no portion of the channel 50 on the upstream side of the channel 50 has a consistent depth. As such, the paint exiting the outer cylindrical end 25 of the side bore 32 can either directly exit the channel 50 or can travel along the channel axis 57. The paint exiting the outer cylindrical end 25 of the side bore 32 cannot flow along a consistent depth channel in the upstream direction due to the bowl 31. As such, the channels 50 only extend in the downstream direction, and do not extend in the upstream direction, with respect to the outer cylindrical end 25 of the side bores 32.

The downstream lip 53 forms the downstream terminus of the channel 50. The downstream lip 53 is formed by the transition 52. In particular, the downstream lip 53 is formed as the decreased or decreasing radius of the transition 52 intersects with the channel walls 54, thus forming the downstream terminus of the channel 50. The lateral channel edge 59 defines the boundary of the channels 50 and the exterior surface 56. Two lateral channel edges 59 extend in parallel for each channel 50. The lateral channel edges 59 extend only along the cylindrical surface 56 and stop at the upstream end of the transition 51, the lateral channel edges 59 giving way to the downstream lip 53 as the boundary of the channel 50 and the transition 52. The downstream lip 53 is located downstream of the upstream edge of the transition 52. The downstream lip 53 is not located upstream of the upstream edge of the transition 53. The lateral channel edge 59 is located upstream of the upstream edge of the transition 52. The lateral channel edge 59 is not located downstream of the upstream edge of the transition 52. The depth of the channel 50 can stay the same along most, or all, of the length of the channel 50. The depth of the channel 50 decreases along the transition 52. The depth of the channel 50 decreases along the downstream lip 53.

The channels 50 can each have a length, from the outer cylindrical ends 25 of the side bores 32 to the downstream lips 53, of 0.4-1.5 inches (about 10.1-38.1 millimeters), although shorter and greater lengths are possible.

Multiple channels 50 are arrayed about the piston axis 41. The channels 50 can be evenly arrayed about the piston axis 41. In some examples, each channel 50 may only extend around a quarter of the circumference of the manifold portion 51. In some examples, each channel 41 may extend less than half way around the circumference of the manifold portion 51. In some examples, each channel 41 may not extend or otherwise wrap entirely around the circumference of the manifold portion 51.

As shown, each channel 50 includes a channel axis 57. Each channel 50 is coaxial with its channel axis 57. While each channel 50 is open along its entire length (e.g., in the manner of a trench, not being fully enclosed) and therefore not forming an entire cylindrical shape, the rounded channel wall 54 of each channel 50 would form a cylindrical shape that is coaxial with the channel axis 57 were the channel wall 54 fully annular and not open. Each channel 50 intersects with the side bore axis 55. In particular, the channel axis 57 intersects with the side bore axis 55.

In the illustrated embodiment, each channel 50 is straight. Each channel 50 is straight along its entire length. Each channel 50 can be straight despite its radial depth changing along its length. Each channel 50 can be straight from the outer cylindrical end 25 of the side bore 32 (or the bowl 31) to its downstream lip 53. In this embodiment, each channel 50 does not bend along its entire length. In this embodiment, each channel 50 does not curve along its entire length. Each channel 50 can remain aligned with its channel axis 57 along its entire length. The straightness of the channel 50 can reduce hydraulic resistance and provide a consistent flow path, as opposed to a curved channel length, for supporting jets exiting the channels 50 from the openings 53.

As shown, the channels 50 do not extend parallel with the reciprocation axis 41. The channels 50 are angled with respect to the piston axis 41. The channels 50 are orientated tangentially, or substantially tangentially, with respect to the circumference of the piston rod 27. The channels 50 are offset with respect to the piston axis 41, and further the center of mass of the piston 15. The channel axes 57 do not extend parallel with the piston axis 41. The channel axes 57 are angled with respect to the piston axis 41. The channel axes 57 are orientated tangentially, or substantially tangentially, with respect to the circumference of the piston rod 27. The channel axes 57 are offset with respect to the piston axis 41, and further the center of mass of the piston 15.

Each channel 50 directs a jet of paint that exits the channel 50 from the downstream lip 53. The jet of paint can be along the channel axis 57. The jet of paint can be aligned with the channel axis 57. The jet of paint can be coaxial with the channel axis 57. The offset angle of the channel 50 results in the jet of paint exiting the downstream lip 53 of the channel 50 imparting a moment on the piston 15 about the piston axis 41. The cumulative moments of the jets from the channels 50, arrayed about the piston 15, rotates the piston 15 with each ejection of paint during each reciprocation cycle of the piston 15.

Expelling paint to generate rotational moments about the piston 50 incrementally rotates the piston 15 about the piston axis 41 with each reciprocation cycle such that piston 15 makes one complete 360 degree rotation over multiple reciprocation cycles. The rotational force is provided solely by the ejection of paint from the side bores 32 and/or openings 53 of the channel 50. The cylinder 12 is fixed and does not rotate, and as such the piston 15 rotates relative to the cylinder 12 during pumping of paint. The first seal 22, fixed to the manifold portion 51, rotates with the manifold portion 51 and rotates relative to the cylinder 12. The exterior surface of the main body 48 rotates relative to the second seal 29 (FIG. 4).

Rotating piston 15 relative to cylinder 12 provides advantages. The interfacing surfaces experience wear and erosion due to the tight interface fit at the interfacing surfaces, particularly between the first seal 22, the second seal 29, the cylinder 12, and the main body 48. Grit and other solids in the fluid can become disposed between the interfacing surfaces, thereby causing accelerated wear on the interfacing surfaces. The grit and other solids can cause seals 22, 29 to wear asymmetrically. Asymmetrical wear leads to greater penetration of paint between the interfacing surfaces, leading to imbalanced reciprocation of piston 15 and potential creation of a bypass channel past seals 22, 29 that allows the paint to flow through pressurizing seals 22, 29. Continuously rotating piston 15 while piston 15 reciprocates within cylinder 12 induces symmetrical wear of dynamic interfacing sealing surfaces. If grit or other solids become disposed between the interfacing surfaces, rotating piston 15 distributes the wear caused by the grit and other solids about the circumference of the interfacing surfaces. Rotating of the piston 15 thereby minimizes the likelihood of a bypass channel forming, preventing seals 22 and/or 29 from failing prematurely. Symmetrical wear also prevents imbalance of the piston 15, as symmetrical wear of seals 22 and/or 29 causes the imparted forces to be evenly distributed.

In some embodiments, the side bores 32 may not be offset from the piston axis 41, such that ejection of paint from the side bores 32 itself does not create a moment in the piston 15 about the piston axis 41 to rotate the piston 15. Alternatively, the side bores 32 may generate little or no rotational moment. Rather, the rotational moment that rotates the piston 15 is generated by ejection of the paint from the openings 53 at the end of the channels 50. In some embodiments, most or all of the rotational moment that rotates the piston 15 is generated by ejection of the paint from the openings 53 at the end of the channels 50.

Although the present invention has been described with reference to preferred embodiments, workers skilled in the art will recognize that changes may be made in form and detail without departing from the spirit and scope of the invention.

The invention claimed is:

1. A piston rod elongate along a reciprocation axis, the piston rod comprising:

an interior piston chamber open in a first direction along the reciprocation axis and closed in a second direction along the reciprocation axis;

one or more channels formed on an exterior of the piston rod; and one or more side bores extending through the piston rod and fluidly connecting the interior piston chamber with the one or more channels respectively, wherein each of the one or more side bores is associated with a respective channel of the one or more channels, and each of the one or more side bores is angled relative to the reciprocation axis to direct flow of paint in a downstream direction and into the respective channel as the paint exits the side bore, and wherein each of the one or more side bores is angled offset relative to the reciprocation axis to direct the flow of paint along a vector to impart a moment on the piston rod;

wherein each channel of the one or more channels extends at least partially axially and is open along a length of the channel;

wherein each of the one or more channels is angled offset with respect to the reciprocation axis; and wherein the flow of paint ejected from each of the one or more channels imparts a rotational moment on the piston rod during pumping.

2. The piston rod of claim 1, wherein each of the one or more channels includes a downstream lip, and wherein the flow of paint ejects from each channel at the downstream lip.

3. The piston of claim 2, wherein the downstream lip defines a downstream terminus of the channel.

4. The piston of claim 3, wherein a downstream terminus of each channel is formed by a transition at which a diameter of the piston rod transitions from a wider diameter to a narrower diameter.

5. The piston rod of claim 1, wherein each of the one or more channels extends straight along the length of the channel.

6. The piston rod of claim 1, wherein each of the one or more channels extends straight.

7. The piston rod of claim 1, wherein a depth of each of the one or more channels changes along the length of the channel.

8. The piston rod of claim 1, wherein a downstream end of each of the one or more channels terminates in a transition formed on the piston rod, and wherein a diameter of the piston rod reduces from an upstream end of the transition to a downstream end of the transition along the transition.

9. The piston rod of claim 1, wherein the one or more side bores comprises at least three side bores, the one or more channels comprises at least three channels, and the at least three side bores are respectively fluidly connected to the at least three channels.

10. The piston rod of claim 9, wherein the at least three side bores are evenly arrayed about the piston rod, and the at least three channels are evenly arrayed about the piston rod.

11. The piston rod of claim 1, wherein a first seal is captured on an exterior of the piston rod.

12. The piston rod of claim 1, wherein a bowl is formed at an intersection between a side bore of the one or more side bores and a channel of the one or more channels.

13. The piston rod of claim 1, wherein:

the piston rod has a first end, a main body, and a second end;

the first and second ends are located at opposite axial ends of the main body;

the main body includes an elongated cylindrical surface;

the first end includes a piston coupling; and the second end includes the interior piston chamber, the one or more side bores, and the one or more channels.

14. The piston rod of claim 13, wherein the second end has a first diameter and the main body has a second diameter, the first diameter larger than the second diameter.

15. The piston rod of claim 14, wherein a transition is formed between the second end and the main body, the transition sloped between the first diameter and the second diameter.

16. The piston rod of claim 13, wherein each channel of the one or more channels has a variable depth.

17. The piston rod of claim 13, further comprising:

a manifold portion is formed on the second end of the piston rod;

wherein the manifold portion has a first diameter and the main body has a second diameter;

wherein the first diameter is larger than the second diameter; and wherein at least part of each channel of the one or more channels extends into an exterior surface of the manifold portion.

18. A piston rod elongate along a reciprocation axis and configured to reciprocate along and rotate on the reciprocation axis, the piston rod comprising:

a first end, a main body, and a second end located at an opposite end of the main body from the first end, the main body including an elongated cylindrical surface;

a piston coupling including a head and a neck disposed at the first end;

an interior piston chamber formed in the second end and open in a first direction along the reciprocation axis and closed in a second direction along the reciprocation axis;

one or more channels formed on an exterior of the piston rod; and one or more side bores extending through the piston rod and fluidly connecting the interior piston chamber with the one or more channels respectively, wherein each of the one or more side bores is associated with a respective channel of the one or more channels and each of the one or more side bores is angled offset relative to the reciprocation axis to direct the flow of paint along a vector to impart a moment on the piston rod to induce rotation of the piston rod;

wherein each channel of the one or more channels extends at least partially axially and is open along a length of the channel;

wherein each of the one or more channels is angled offset with respect to the reciprocation axis; and wherein the flow of paint ejected from each of the one or more channels imparts a rotational moment on the piston rod during pumping to induce the rotation of the piston rod.

* * * * *